United States Patent
Cheng et al.

(10) Patent No.: US 9,363,830 B2
(45) Date of Patent: *Jun. 7, 2016

(54) RANDOM ACCESS METHOD, RADIO COMMUNICATION TERMINAL DEVICE, RECEIVING METHOD, AND BASE STATION APPARATUS

(71) Applicant: Optis Wireless Technology, LLC, Plano, TX (US)

(72) Inventors: Jun Cheng, Kyoto (JP); Akihiko Nishio, Kanagawa (JP); Kenichi Miyoshi, Kanagawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,929

(22) Filed: May 29, 2015

(65) Prior Publication Data

US 2015/0264719 A1    Sep. 17, 2015

Related U.S. Application Data

(63) Continuation of application No. 14/283,525, filed on May 21, 2014, now Pat. No. 9,060,356, which is a continuation of application No. 13/158,014, filed on Jun. 10, 2011, now Pat. No. 8,761,131, which is a (Continued)

(30) Foreign Application Priority Data

Mar. 9, 2004    (JP) .................................. 2004-065625

(51) Int. Cl.
*H04W 72/04*    (2009.01)
*H04W 74/08*    (2009.01)

(Continued)

(52) U.S. Cl.
CPC .......... *H04W 74/0833* (2013.01); *H04W 72/04* (2013.01); *H04W 72/0446* (2013.01); *H04W 36/16* (2013.01); *H04W 74/004* (2013.01)

(58) Field of Classification Search
CPC ................................................. H04W 72/0446
USPC ......................................................... 370/336
See application file for complete search history.

(56) References Cited

U.S. PATENT DOCUMENTS 5,065,398 A  *  11/1991  Takashima .................... 370/230
5,295,154 A       3/1994   Meier (Continued)

FOREIGN PATENT DOCUMENTS

DE          19820684       11/1999
EP          0 917 317      5/1999

(Continued)

OTHER PUBLICATIONS

U.S. Appl. No. 14/283,525, filed May 21, 2014; Inventor: Cheng et al.

(Continued)

*Primary Examiner* — Andrew Lai
*Assistant Examiner* — Andrew C Lee
(74) *Attorney, Agent, or Firm* — Nixon & Vanderhye P.C.

(57) ABSTRACT

Random access technology is provided for establishing an individual channel between a radio communication terminal device and a base station device in a short time and a radio communication terminal device executing the random access method. A RACH sub-channel allocation unit allocates a transmission packet input from a replication unit to an arbitrary sub-carrier at the RACH arbitrary time slot at random. An allocation unit judges whether an overlap is generated in the allocation result obtained by the RACH sub-channel allocation unit.

22 Claims, 20 Drawing Sheets

Related U.S. Application Data continuation of application No. 12/965,641, filed on Dec. 10, 2010, now Pat. No. 8,000,295, which is a continuation of application No. 10/591,712, filed as application No. PCT/JP2005/003329 on Feb. 28, 2005, now Pat. No. 7,873,000.

(51) Int. Cl.
    *H04W 36/16* (2009.01)
    *H04W 74/00* (2009.01)

(56) References Cited

U.S. PATENT DOCUMENTS

| | | | |
|---|---|---|---|
| 5,303,234 A * | 4/1994 | Kou | 370/442 |
| 5,390,181 A | 2/1995 | Campbell et al. | |
| 5,434,847 A | 7/1995 | Kou | |
| 5,453,987 A * | 9/1995 | Tran | 370/447 |
| 5,493,569 A * | 2/1996 | Buchholz et al. | 370/442 |
| 5,499,243 A | 3/1996 | Hall | |
| 5,515,379 A | 5/1996 | Crisler et al. | |
| 5,535,210 A | 7/1996 | Smolinske et al. | |
| 5,544,075 A | 8/1996 | Janex | |
| 5,566,181 A | 10/1996 | Huang | |
| 5,594,720 A | 1/1997 | Papadopoulos et al. | |
| 5,594,738 A | 1/1997 | Crisler et al. | |
| 5,673,259 A | 9/1997 | Quick | |
| 5,740,166 A | 4/1998 | Ekemark et al. | |
| 5,740,167 A | 4/1998 | Taketsugu | |
| 5,752,193 A * | 5/1998 | Scholefield et al. | 455/452.2 |
| 5,768,527 A | 6/1998 | Zhu | |
| 5,850,392 A * | 12/1998 | Wang et al. | 370/335 |
| 5,883,887 A | 3/1999 | Take | |
| 5,940,006 A * | 8/1999 | MacLellan et al. | 370/314 |
| 5,940,399 A * | 8/1999 | Weizman | 370/445 |
| 6,058,106 A | 5/2000 | Cudak | |
| 6,075,779 A * | 6/2000 | Agarwal et al. | 370/337 |
| 6,137,796 A | 10/2000 | Derango | |
| 6,249,515 B1 | 6/2001 | Kim | |
| 6,317,854 B1 * | 11/2001 | Watanabe | 714/749 |
| 6,347,120 B1 | 2/2002 | Sakoda | |
| 6,434,367 B1 | 8/2002 | Kumar | |
| 6,545,994 B2 | 4/2003 | Nelson | |
| 6,587,672 B1 | 7/2003 | Chuah | |
| 6,643,318 B1 | 11/2003 | Parsa | |
| 6,760,318 B1 | 7/2004 | Bims | |
| 6,868,079 B1 * | 3/2005 | Hunt | 370/345 |
| 6,895,039 B2 | 5/2005 | Kuzminskiy | |
| 6,907,015 B1 * | 6/2005 | Moulsley et al. | 370/329 |
| 6,917,602 B2 | 7/2005 | Toskala et al. | |
| 6,917,606 B2 | 7/2005 | Sashihara | |
| 6,920,121 B2 | 7/2005 | Tan | |
| 6,925,070 B2 | 8/2005 | Proctor | |
| 6,937,641 B2 | 8/2005 | Li | |
| 6,967,937 B1 | 11/2005 | Gormley | |
| 7,000,021 B1 | 2/2006 | Radhakrishnan | |
| 7,006,477 B1 * | 2/2006 | Balachandran et al. | 370/337 |
| 7,039,030 B2 | 5/2006 | Terry | |
| 7,088,734 B2 | 8/2006 | Newberg | |
| 7,139,274 B2 | 11/2006 | Attar | |
| 7,200,649 B1 | 4/2007 | Batke | |
| 7,315,898 B2 | 1/2008 | Kohno | |
| 7,397,790 B2 | 7/2008 | Zeira | |
| 7,502,365 B2 | 3/2009 | Yamagata | |
| 7,616,704 B2 | 11/2009 | Li | |
| 7,873,000 B2 | 1/2011 | Cheng et al. | |
| 8,000,295 B2 | 8/2011 | Cheng et al. | |
| 8,761,131 B2 | 6/2014 | Cheng et al. | |
| 2001/0014091 A1 | 8/2001 | Yamada | |
| 2002/0013135 A1 | 1/2002 | Proctor, Jr. | |
| 2002/0159470 A1 | 10/2002 | Atarashi | |
| 2003/0076812 A1 | 4/2003 | Benedittis | |
| 2003/0103521 A1 | 6/2003 | Raphaeli | |
| 2003/0120802 A1 | 6/2003 | Kohno | |
| 2003/0126238 A1 | 7/2003 | Kohno | |
| 2003/0156594 A1 * | 8/2003 | Trott et al. | 370/442 |
| 2003/0174663 A1 | 9/2003 | Dillon | |
| 2004/0052234 A1 | 3/2004 | Ameigeiras | |
| 2004/0071194 A1 | 4/2004 | Suwa | |
| 2004/0132442 A1 | 7/2004 | Zimmermann | |
| 2005/0009473 A1 * | 1/2005 | Ranta et al. | 455/83 |
| 2005/0080916 A1 | 4/2005 | Katayama | |
| 2005/0088990 A1 | 4/2005 | Gibbons | |
| 2005/0135416 A1 | 6/2005 | Ketchum | |
| 2005/0243744 A1 | 11/2005 | Tan | |
| 2007/0064669 A1 | 3/2007 | Classon | |
| 2007/0195730 A1 | 8/2007 | Cheng | |
| 2008/0049708 A1 | 2/2008 | Khan | |
| 2008/0227475 A1 | 9/2008 | Suemitsu | |
| 2009/0257421 A1 | 10/2009 | Nakashima | |
| 2011/0081916 A1 | 4/2011 | Cheng | |
| 2011/0243109 A1 | 10/2011 | Cheng | |
| 2012/0237045 A1 | 9/2012 | Mihelich | |

FOREIGN PATENT DOCUMENTS

| | | |
|---|---|---|
| EP | 0 993 214 | 4/2000 |
| EP | 1 143 755 | 10/2001 |
| EP | 1 211 837 | 6/2002 |
| JP | 9-214507 | 8/1997 |
| JP | 2001-44969 | 2/2001 |
| JP | 2001-268051 | 9/2001 |
| JP | 4734233 | 4/2011 |
| JP | 4776738 | 7/2011 |
| JP | 2011-166831 | 8/2011 |
| JP | 2011-199866 | 10/2011 |
| KR | 1020010079982 | 8/2001 |
| WO | WO 99/21375 | 4/1999 |
| WO | WO 01/11909 | 2/2001 |
| WO | WO 03/041438 | 5/2003 |
| WO | WO 2004/019630 | 3/2004 |

OTHER PUBLICATIONS

Office Action mailed Oct. 23, 2014 in U.S. Appl. No. 14/283,525.
Korean Office Action dated Jul. 28, 2011, 3 pages.
European Search Report dated May 22, 2013, 6 pages.
European Search Report dated May 24, 2011, 3 pages.
PCT International Search Report dated Jun. 14, 2005, 2 pages.
K. Tachikawa, "W-CDMA Mobile Communications Scheme," Maruzen Co., Ltd., Jun. 2001, pp. 45-47, with partial English translation.
European Office Action dated Nov. 7, 2014 in EP 05719646.1, 5 pages.
European Summons to attend oral proceedings dated Mar. 31, 2016 issued in EP 05719646.1, 7 pages.

* cited by examiner

RANDOM ACCESS METHOD, RADIO COMMUNICATION TERMINAL DEVICE, RECEIVING METHOD, AND BASE STATION APPARATUS

PRIORITY APPLICATIONS

This is a continuation application of application Ser. No. 14/283,525, filed May 21, 2014, now U.S. Pat. No. 9,060,356, which is a continuation of application Ser. No. 13/158,014, filed Jun. 10, 2011, now U.S. Pat. No. 8,761,131, which is a continuation application of application Ser. No. 12/965,641, filed Dec. 10, 2010, now U.S. Pat. No. 8,000,295, which is a continuation application of application Ser. No. 10/591,712 filed Sep. 6, 2006, now U.S. Pat. No. 7,873,000, which is a national stage of PCT/JP2005/003329 filed Feb. 28, 2005, which is based on Japanese Application No. 2004-065625 filed Mar. 9, 2004, the entire contents of each which are incorporated by reference herein.

TECHNICAL FIELD

The present invention relates to a random access method in a radio communication system composed of a plurality of radio communication terminal apparatuses and base station apparatuses, and a radio communication terminal apparatus of the random access method.

BACKGROUND

Conventionally, in a radio communication system by a cellular scheme, when a radio communication terminal apparatus starts or restarts communication, an individual channel between the radio communication terminal apparatus and the base station apparatus is not established yet, and the radio communication terminal apparatus is therefore designed to attempt an access to the base station apparatus using a random access channel (hereinafter "RACH": Random Access Channel). For example, in the radio communication system by a W-CDMA scheme, a slotted ALOHA scheme is adopted. When each of a plurality of radio communication terminal apparatuses start or restart communication, access to the base station apparatus is attempted at an arbitrary timing out of start timing candidates (RACH subchannel). If there is no response from the base station apparatus within predetermined time from the access time, the access is determined failed, and access to the base station apparatus is attempted again (see, for example, Non-Patent Document 1).

Further, in the radio communication system by a multi-carrier transmission scheme, a technology is known in which when transmission packet is transmitted to the base station apparatus by RACH for establishing an individual channel, the radio communication terminal apparatus selects slot (timing) and subcarrier (frequency) of RACH and spreading code based on certain conditions, spreads the transmission packet by the selected spreading code, and then transmits the packet to the base station apparatus at the selected tuning and frequency (see, for example, Patent Document 1). Furthermore, in a technology disclosed in Patent Document 1, a radio communication terminal apparatus attempts an access to the base station apparatus, and if there is no response from the base station apparatus within predetermined time from the access time, the radio communication terminal apparatus attempts an access to the base station apparatus again.

Patent Document 1: Japanese Patent Application Laid-Open No. 2001-268051
Non-Patent Document 1: Keiji Tachikawa (ed.), "W-CDMA Mobile Communication Scheme," Maruzen Co., Ltd., p. 45, Jun. 25, 2001

DISCLOSURE

However, in technologies disclosed in Patent Document 1 and Non-Patent Document 1, a plurality of radio communication terminal apparatuses attempt an access to the base station apparatus by RACH and access to the base station apparatus is attempted again after determining success or failure for establishing individual channels so that a case may occur when establishing the individual channel after the first access to the base station apparatus may require time. Furthermore, the number of transmission packets transmitted by RACH increases as the number of radio communication terminal apparatuses belonging to the same cell increases so that the likelihood of collision of transmission packets becomes high and establishing the individual channels requires longer time. For this reason, with the conventional technology, the problems of deterioration of communication quality and non-accessible state for communication and the like are made more likely to occur in the radio communication terminal apparatus designed to plan a service demanding a QoS (Quality of Service) delay requirement.

It is therefore an object of the present invention to provide a random access method for establishing an individual channel between a radio communication terminal apparatus and a base station apparatus in a short time, and a radio communication terminal apparatus for operating this random access method.

A Random access method according to the present invention includes a duplication step of duplicating a transmission packet, an assignment step of assigning each of a plurality of duplicated transmission packets to a random access channel, and a transmission step of transmitting the plurality of the transmission packets in accordance with an assignment result in the assignment step.

According to this method, the radio communication terminal apparatus assigns and transmits a plurality of transmission packets to the base station apparatus by RACH so that, even when many radio communication terminal apparatuses belong to the same cell, the likelihood becomes high that, one of the plurality of transmission packets is received by the base station apparatus without colliding with transmission packets transmitted from other radio communication terminal apparatuses. As a result, according to this method, the radio communication terminal apparatus transmits the duplicated transmission packets to RACH without waiting for a response from the base station apparatus to confirm whether or not the transmission packets transmitted to RACH are received at the base station apparatus, thereby establishing an individual channel to the base station apparatus in a short time.

The random access method according to the present invention includes, in the above-mentioned invention, a determination step of determining the number of duplications of the transmission packet in the duplication step according to a priority of service planned after communication is started.

According to this method, in addition to the effect of the invention, the number of transmission packets transmitted to RACH by the radio communication terminal apparatus is determined according to kinds of services planned after the individual channel is established so that, out of the plurality of the radio communication terminal apparatuses belonging to the same cell, one with higher urgency is more likely to establish the individual channel. As a result, according to this method, the problems of deterioration of communication quality, non-accessible state for communication and the like are made less likely to occur in the plurality of the whole radio communication terminal apparatuses belonging to the same cell.

The random access method according to the present invention includes, in the above-mentioned invention, a determination step of determining the number of duplications of the transmission packet in the duplication step according to the number of retransmissions of the transmission packet.

According to this method, in addition to the effect of the invention, the number of duplications of the transmission packet increases according to the number of retransmissions of transmission packets so that, out of the plurality of the radio communication terminal apparatuses belonging to the same cell, one with higher urgency is more likely to establish the individual channel. As a result, according to this method, the problems of deterioration of communication quality, non-accessible state for communication and the like are made less likely to occur in the plurality of the whole radio communication terminal apparatuses belonging to the same cell.

The random access method according to the present invention includes, in the above-mentioned invention, a determination step of determining the number of duplications of the transmission packet in the duplication step according to the number of the radio communication terminal apparatuses belonging to the same cell and using said random access channel.

According to this method, in addition to the effect of the invention, if the number of the radio communication terminal apparatuses belonging to the same cell increases, radio communication terminal apparatuses make less the number of the duplications of the transmission packet so that it is possible to reduce the likelihood of collision of transmission packets. As a result, according to this method, the problems of deterioration of communication quality, non-accessible state for communication and the like are made less likely to occur in the plurality of the whole radio communication terminal apparatuses belonging to the same cell.

With the random access method according to the present invention, in the assignment step of the above-mentioned invention, each of the plurality of duplicated transmission packets are assigned to one of time slots in the random access channel.

With the random access method according to the present invention, in the assignment step of the above-mentioned invention, each of the plurality of duplicated transmission packets are assigned to one of subcarriers in the random access channel.

According to these methods, in addition to the effect of the invention, the radio communication terminal apparatus assigns the plurality of transmission packets randomly to one of time slots and subcarriers of RACH so that it is possible to reduce load of the signal processing necessary for the assignment of transmission packets in the radio communication terminal apparatus.

With the random access method according to the present invention, in the assignment step of the above-mentioned invention, each of the plurality of duplicated transmission packets are assigned to one of time slots and one of subcarriers in the random access channel.

According to this method, in addition to the effect of the invention, the radio communication terminal apparatus assigns the plurality of transmission packets randomly to time slots and subcarriers of RACH so that, even when many radio communication terminal apparatuses belong to the same cell, it is possible to reduce the likelihood of collision of the transmission packets.

With the random access method according to the present invention, in the assignment step of the above-mentioned invention, each of the plurality of duplicated transmission packets are assigned to one of spreading codes in the random access channel.

According to this method, in addition to the effect of the invention, the plurality of radio communication terminal apparatuses spread and transmit the transmission packets to the base station apparatus using the spreading codes selected randomly so that, even when many radio communication terminal apparatuses belong to the same cell, it is possible to reduce the likelihood of collision of transmission packets.

A radio communication terminal apparatus according to the present invention adopts a configuration having: a duplication section that duplicates a transmission packet; an assignment section that assigns each of the plurality of duplicated transmission packets to a random access channel; and a transmission section that transmits the plurality of transmission packets in accordance with an assignment result in the assignment section.

According to this configuration, the radio communication terminal apparatus assigns the plurality of the duplicated transmission packets randomly to RACH and transmits the transmission packets to the base station apparatus so that, even when many radio communication terminal apparatuses belong to the same cell, the likelihood becomes high that, the plurality of transmission packets are received by the base station apparatus without colliding with transmission packets transmitted from other radio communication terminal apparatuses. As a result, according to this configuration, the radio communication terminal apparatus transmits the duplicated transmission packets to RACH without waiting for a response from the base station to confirm whether or not the transmission packets transmitted to RACH are received at the base station, thereby establishing an individual channel to the base station apparatus in a short time.

According to the present invention, the plurality of the radio communication terminal apparatuses assign the plurality of the duplicated transmission packets randomly to RACH and transmits the transmission packets to the base station apparatus so that, even when many radio communication terminal apparatuses belong to the same cell, the likelihood becomes high that, the plurality of transmission packets are received by the base station apparatus without colliding with transmission packets transmitted from other radio communication terminal apparatuses. As a result, according to this invention, the radio communication terminal apparatus transmits the duplicated transmission packets to RACH without waiting for a response from the base station apparatus to confirm whether or not the transmission packets transmitted to RACH are received at the base station, thereby establishing an individual channel to the base station in a short time.

DETAILED DESCRIPTION

Example Embodiment 1

Figure 1:
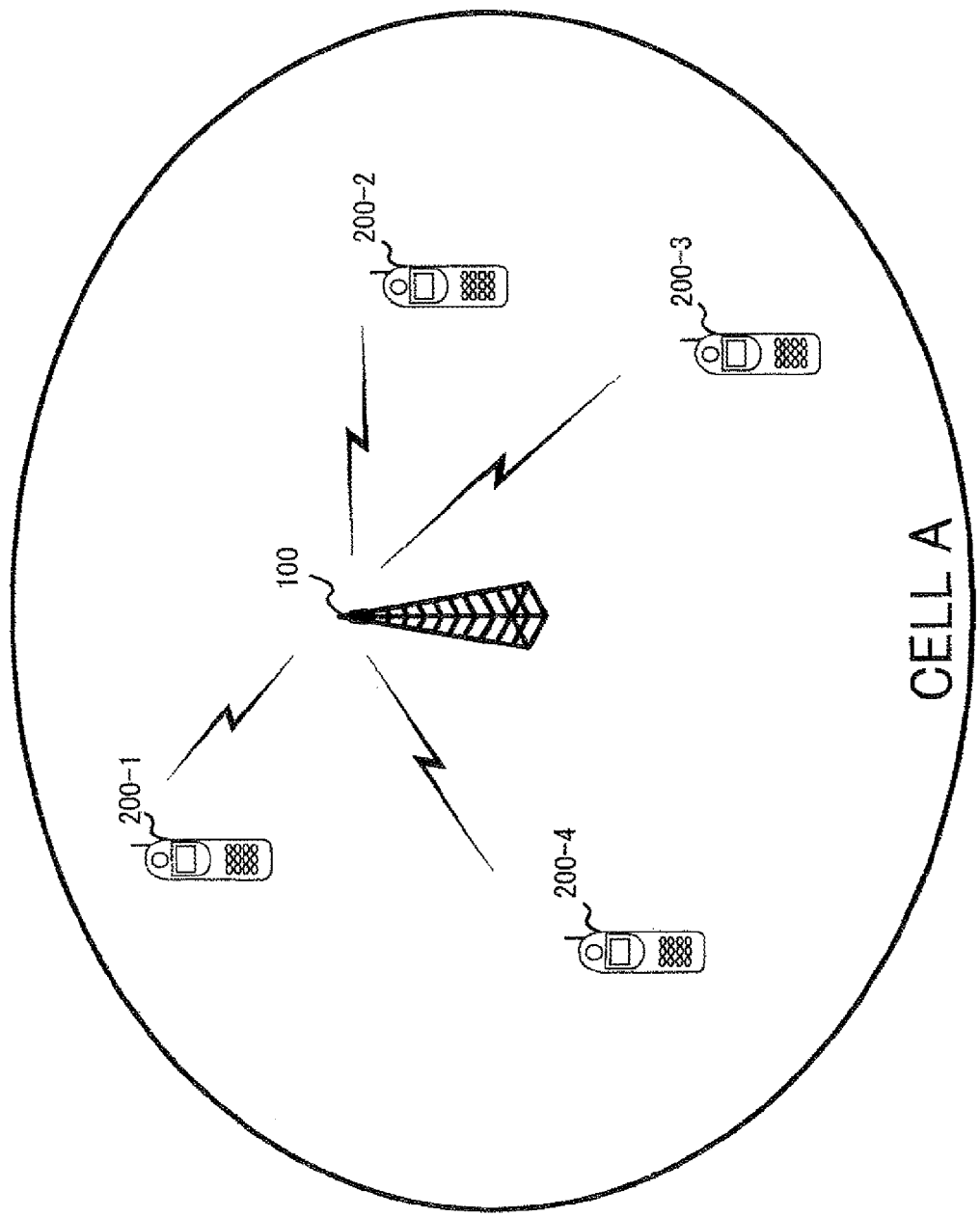
FIG. 1 shows a configuration of a radio communication terminal system using a random access method according to Embodiment 1 of the present invention.

FIG. 1 shows a schematic configuration of a radio communication system composed of four radio communication terminal apparatuses 200-1 to 200-4 and base station apparatus 100 that establish individual channels using a random access method according to Embodiment 1 of the present invention. In FIG. 1, a communication area of this radio communication system is indicated as "cell A." Furthermore, an OFDM (Orthogonal Frequency Division Multiplexing) signal is subjected to packet exchange in cell A of FIG. 1. In addition, the configurations and operations of the radio communication terminal apparatuses 200-1 to 200-4 will be explained below, but the radio communication terminal apparatuses 200-1 to 200-4 refer to the same configuration and the same function so that the branch numbers may be omitted when explanations of the function and the like are made entirely.

Figure 2:
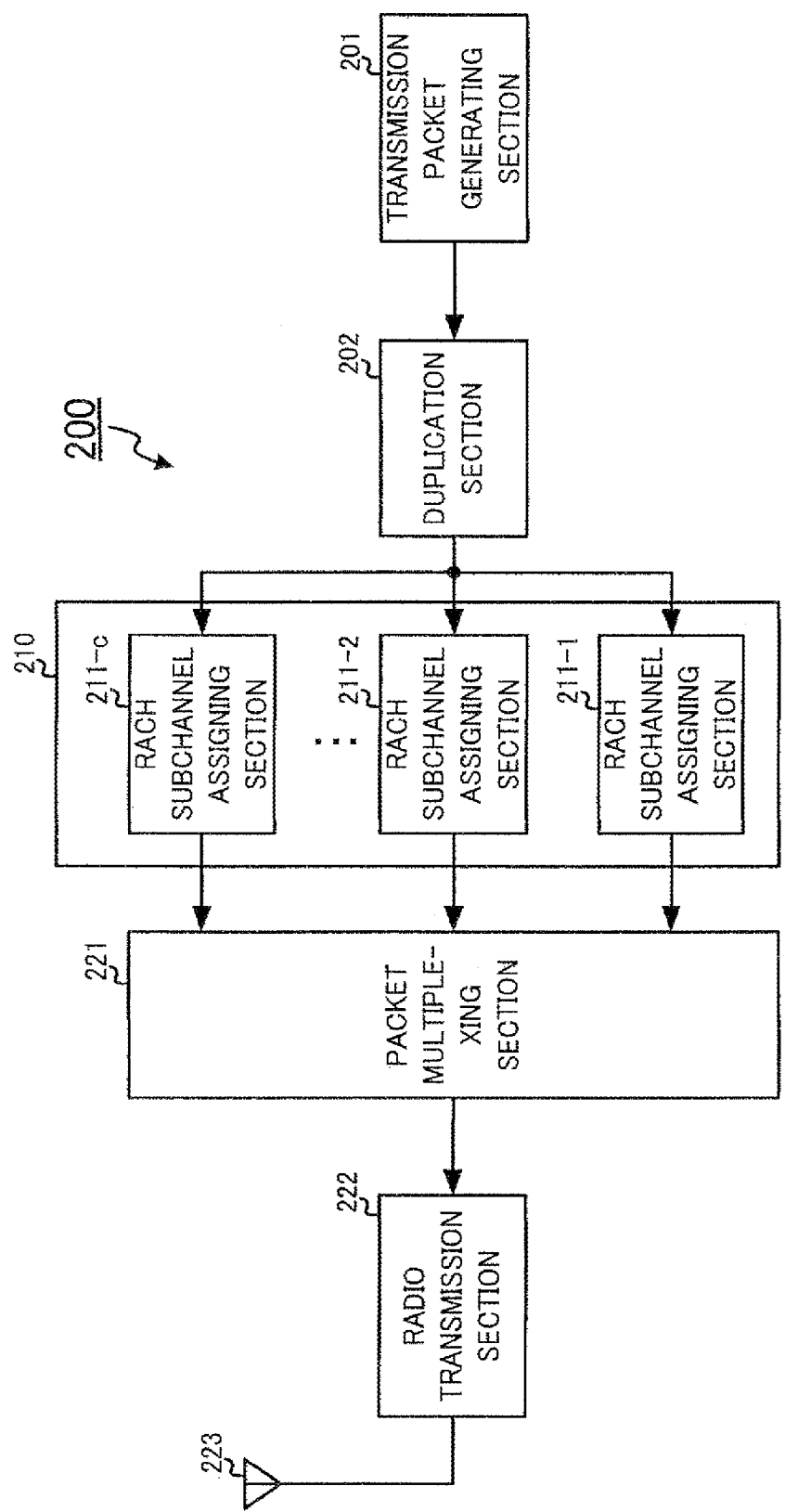
FIG. 2 is a block diagram showing a configuration of a radio communication terminal apparatus according to Embodiment 1 of the present invention.

FIG. 2 is a block diagram showing a configuration of radio communication terminal apparatus 200. Radio communication terminal apparatus 200 includes transmission packet generating section 201, duplication section 202, assignment section 210, packet multiplexing section 221, radio transmission section 222 and antenna element 223. Furthermore, assignment section 210 includes RACH subchannel assigning sections 211-1 to 211-c. In addition, "c" is an arbitrary natural number of two or greater.

Transmission packet generating section 201 generates transmission packet including information of radio communication terminal apparatus 200 necessary for establishing an individual channel to base station apparatus 100 when radio communication terminal apparatus 200 is started or recovered from the idol state, and inputs the generated transmission packet to duplication section 202.

Duplication section 202 duplicates the transmission packet input from transmission packet generating section 201, and inputs c duplicated transmission packets to RACH subchannel assigning sections 211-1 to 211-c, respectively.

RACH subchannel assigning section 211 assigns the transmission packets input from duplication section 202 randomly to arbitrary subcarriers with arbitrary RACH time slots. Assignment section 210 compares the assignment results of RACH subchannel assigning sections 211-1 to 211-c each other, and when transmission packets are assigned to the same subcarrier with the same time slot with overlap, assignment section 210 instructs one of RACH subchannel assigning sections 211 to perform assignment again. Assignment section 210 then instructs RACH subchannel assigning sections 211-1 to 211-c to input transmission packets to packet multiplexing section 221 with the subcarriers of assigned time slots after confirming that time slots and subcarriers assigned by RACH subchannel assigning sections 211-1 to 211-c are not overlapped. RACH subchannel assigning sections 211-1 to 211-c input transmission packets at predetermined timing and frequency to packet multiplexing section 221 in accordance with instructions from assignment section 210.

Packet multiplexing section 221 multiplexes transmission packets input from RACH subchannel assigning sections 211-1 to 211-c and inputs multiplexed transmission packets to radio transmission section 222.

Radio transmission section 222 is composed of S/P converter, IFFT apparatus, P/S converter, guard interval insertion apparatus, bandpass filter, D/A converter, low noise amplifier or the like, and after generating an OFDM (Orthogonal Frequency Division Multiplexing) signal from the transmission packet input from packet multiplexing section 221, radio transmission section 222 transmits the generated OFDM signal by radio to base station apparatus 100 through antenna element 223.

Figure 3:
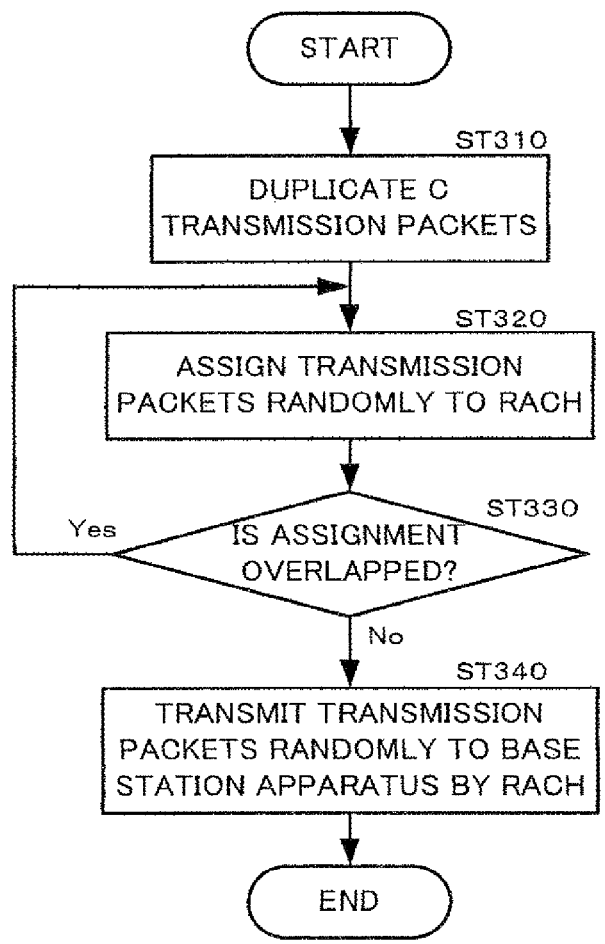
FIG. 3 is a flow chart explaining a random access method according to Embodiment 1 of the present invention.

Next, the operations of radio communication terminal apparatus 200 will be explained using FIG. 3. FIG. 3 is a flow chart showing steps of a random access method according to this embodiment.

First, in step ST310, duplication section 202 duplicates c transmission packets input from transmission packet generating section 201.

Next, in step ST320, RACH subchannel assigning sections 211-1 to 211-c assign the transmission packets input from duplication section 202 randomly to arbitrary subcarriers at arbitrary time slots of RACH.

Next, in step ST330, assignment section 210 determines whether or not assignment results by RACH subchannel assigning sections 211-1 to 211-c are overlapped. When assignment section 210 determines assignment results by RACH subchannel assigning section 211 are overlapped in step ST330, assignment section 210 makes one of RACH subchannel assigning sections 211 which has caused the overlap perform the assignment of step ST320 again. On the other hand, in step ST330, when assignment section 210 determines assignment results by RACH subchannel assigning section 211 are not overlapped, step ST340 is executed.

Next, in step ST340, radio transmission section 222 generates an OFDM signal from the transmission packet input from packet multiplexing section 221, and transmits the generated OFDM signal by radio to base station apparatus 100 by RACH through antenna element 223.

Figure 4A:
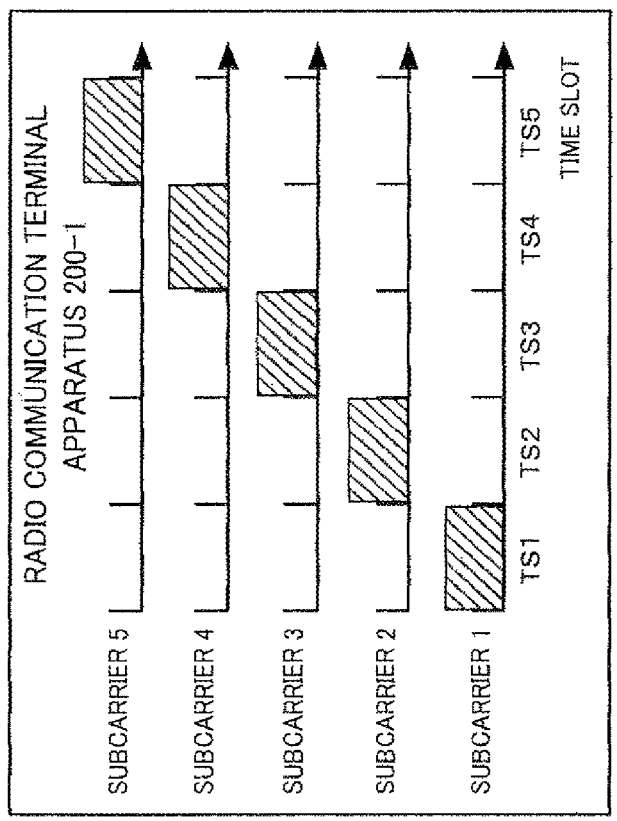
FIG. 4A shows an assignment of a transmission packet to RACH according to Embodiment 1.

FIGS. 4A to 4D and FIGS. 5A to 5E show specific aspect of assigning a transmission packet to the arbitrary subcarriers at arbitrary time slots of RACH by the random access method according to this embodiment. In this embodiment, RACH subchannel assigning section 211 is taken to process five subcarriers (SC) and five time slots (TS) as a unit of RACH and assigns transmission packets randomly within this one unit. As can be seen in FIG. 4A, for example, transmission packets (RACH access signals) are continuously transmitted using five consecutive time slots TS1, TS2, TS3, TS4, TS5 and are consecutive in the time domain.

Figure 4B:
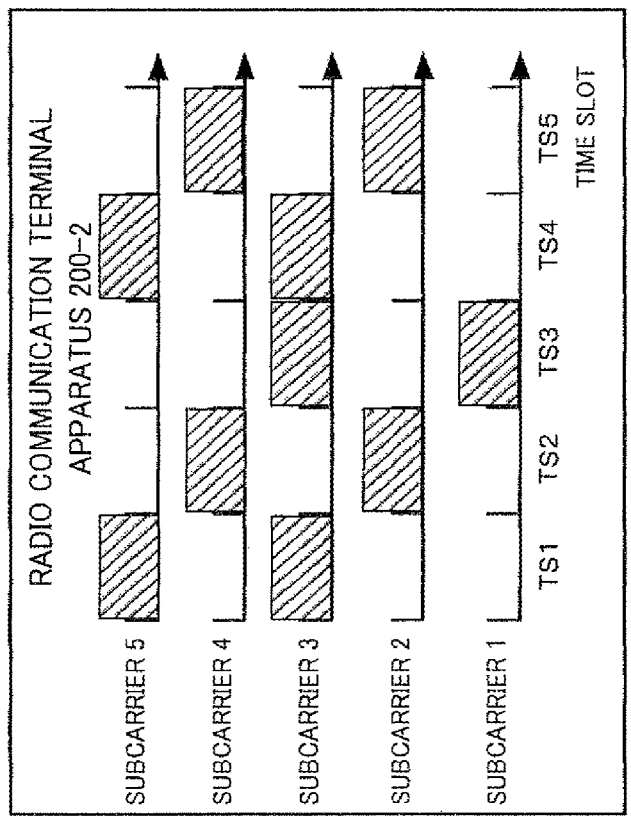
FIG. 4B shows an assignment of a transmission packet to RACH according to Embodiment 1.
Figure 4C:
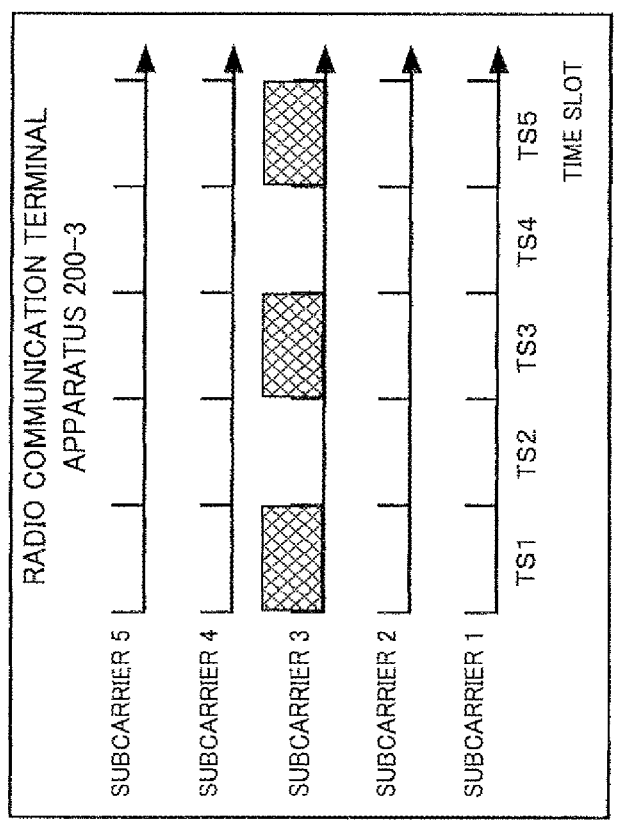
FIG. 4C shows an assignment of a transmission packet to RACH according to Embodiment 1.
Figure 4D:
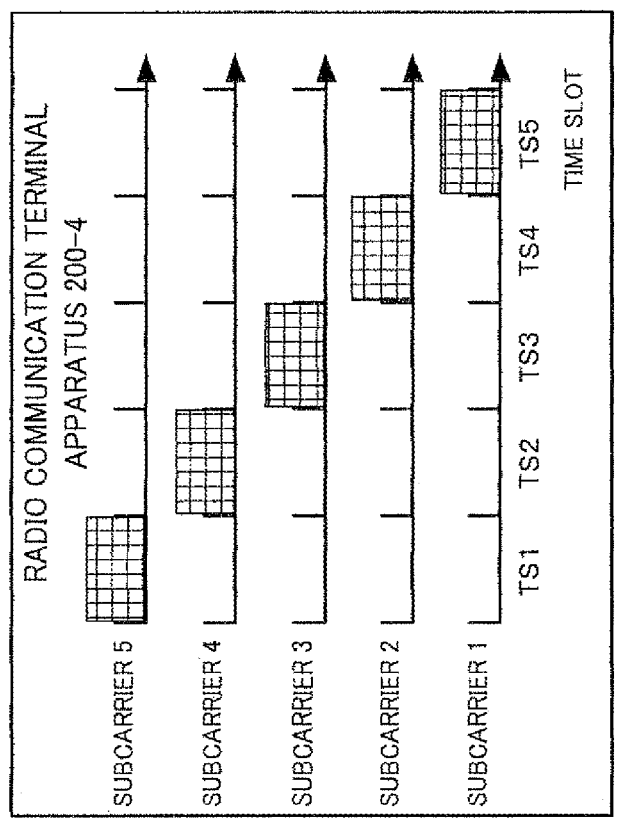
FIG. 4D shows an assignment of a transmission packet to RACH according to Embodiment 1.

FIG. 4A shows an assignment of transmission packets to RACH in radio communication terminal apparatus 200-1, and FIG. 4B to FIG. 4D show radio communication terminal apparatuses 200-2 to 200-4, respectively. FIG. 4A and FIG. 4D show an aspect of randomly assigning transmission packets to one of time slots and to one of subcarriers of RACH, and FIG. 4B to one of subcarriers by all time slots of RACH, and FIG. 4C to one of time slots in SC3 of RACH.

Figure 5A:
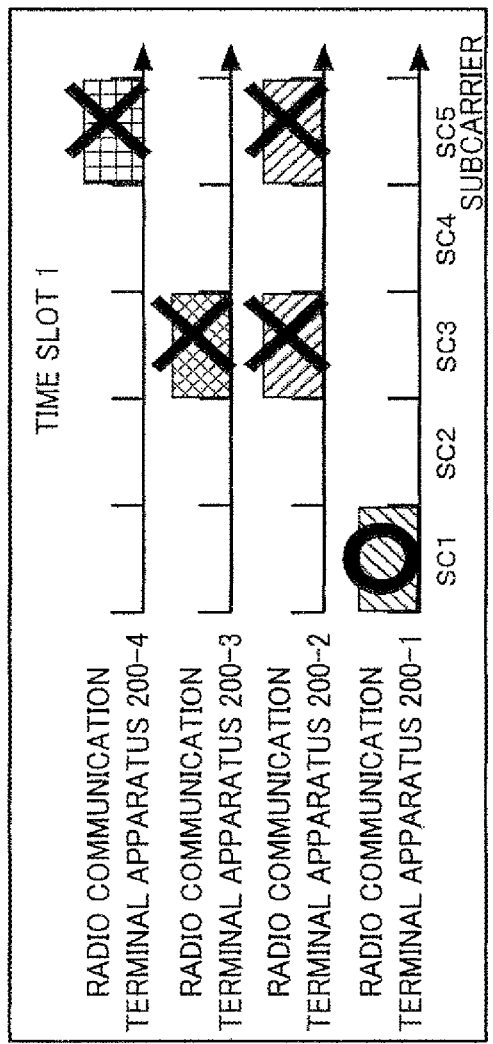
FIG. 5A shows an assignment of a transmission packet to RACH according to Embodiment 1.
Figure 5B:
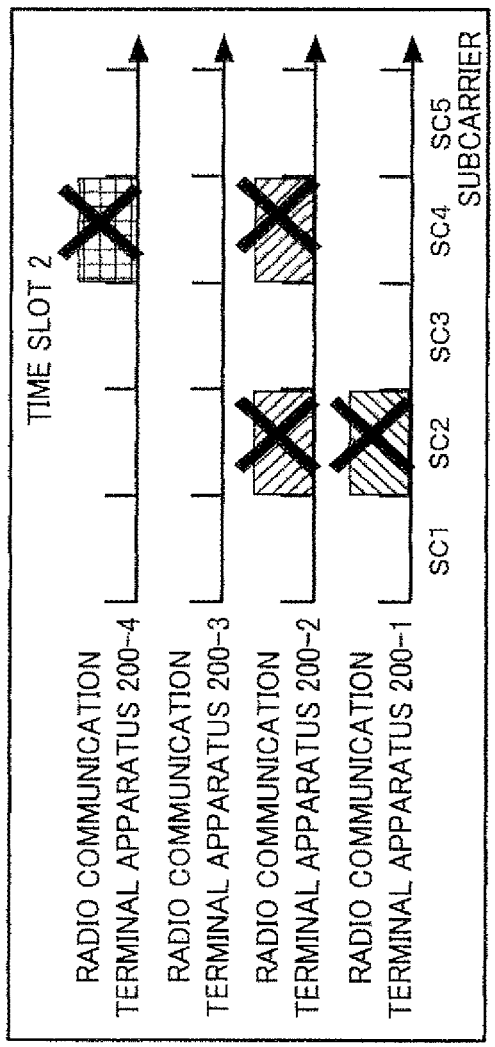
FIG. 5B shows an assignment of a transmission packet to RACH according to Embodiment 1.
Figure 5C:
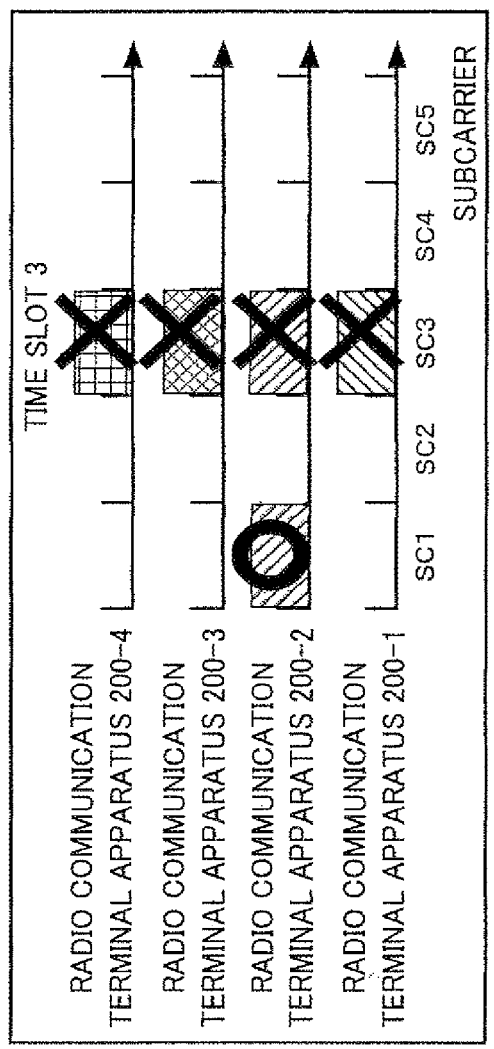
FIG. 5C shows an assignment of a transmission packet to RACH according to Embodiment 1.
Figure 5D:
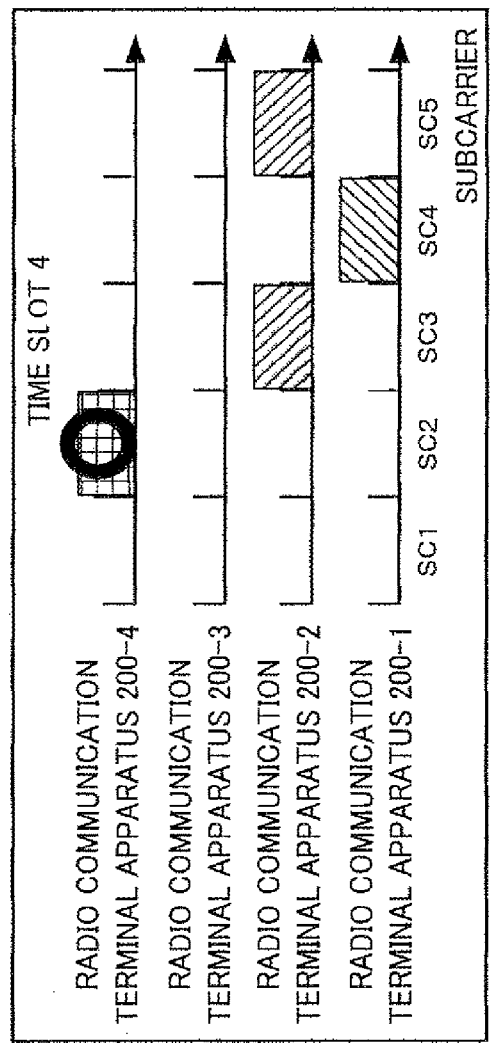
FIG. 5D shows an assignment of a transmission packet to RACH according to Embodiment 1.
Figure 5E:
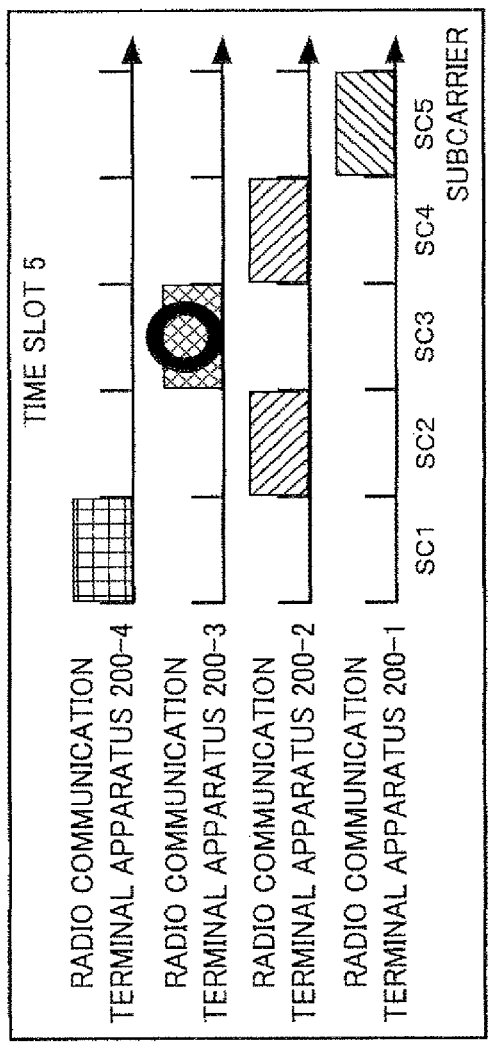
FIG. 5E shows an assignment of a transmission packet to RACH according to Embodiment 1.

FIGS. 5A to 5E show transmission conditions of radio communication terminal apparatuses 200-1 to 200-4 about SC1 to SC5 in timings of TS1 to TS5, in the case that radio communication terminal apparatuses 200-1 to 200-4 transmit transmission packets by the assignment aspects shown in FIGS. 4A to 4D. FIG. 5A shows a transmission condition in TS1, FIG. 5B in TS2, FIG. 5C in TS3, FIG. 5D in TS4 and FIG. 5E in TS5, respectively. FIGS. 5A to 5E append "x" to all colliding transmission packets and "o" to transmission packets first received at base station apparatus 100, per radio communication terminal apparatuses 200-1 to 200-4.

As shown in FIGS. 5A to 5E, individual channels can be established to base station apparatus 100, at a timing of TS1 in radio communication terminal apparatus 200-1, at a timing of TS3 in radio communication terminal apparatus 200-2, at a timing of TS5 in radio communication terminal apparatus 200-3 and at a timing of TS4 in radio communication terminal apparatus 200-4, respectively.

In this way, according to this embodiment, radio communication terminal apparatus 200 assigns a plurality of duplicated transmission packets to RACH randomly in RACH subchannel assigning sections 211-1 to 211-c, and transmits the transmission packets at the assigned time slots and subcarriers without waiting for a response from base station apparatus 100 to the first transmission packets, thereby establishing an individual channel to base station apparatus 100 in a short time.

Furthermore, a plurality of transmission packets are assigned to time slots of RACH randomly only according to radio communication terminal apparatus 200-2 of this embodiment, and to subcarrier of RACH only according to radio communication terminal apparatus 200-3 so that it is possible to reduce load of signal processing in RACH subchannel assigning section 211 necessary for the assignment of transmission packets compared to the case that the plurality of transmission packets are assigned to time slots and subcarriers of RACH randomly.

Moreover, according to radio communication terminal apparatus 200-1 or 200-4 of this embodiment, RACH subchannel assigning section 211 assigns a plurality of transmission packets to one of time slots of RACH and also to one of subcarriers of RACH randomly so that, even when many radio communication terminal apparatuses 200 belong to the same cell, it is possible to reduce the likelihood of collision of transmission packets in RACH.

In addition, the following applications and changes may be possible to the random access method and radio communication terminal apparatus 200 according to this embodiment.

In this embodiment, a case has been described where a plurality of radio communication terminal apparatuses 200 assign transmission packets randomly to time slots and subcarriers of RACH, but the present invention is not limited to this, and, for example, it is equally possible for a plurality of radio communication terminal apparatuses 200 to transmit not OFDM but packet signals of a single carrier by radio communication, and assign those packet signals randomly to the arbitrary time slots of RACH.

Furthermore, in this embodiment, a case has been described where radio communication terminal apparatus 200 assigns randomly and transmits transmission packets to time slots and subcarriers of RACH, but the present invention is not limited to this, and, for example, it is possible for radio communication terminal apparatus 200 to select spreading codes randomly instead of time slots and subcarriers of RACH, and also perform code division of the transmission packets using the selected spreading codes. Furthermore, it is possible for radio communication terminal apparatus 200 to assign transmission packets randomly to RACH subchannel where time slots, subcarriers and spreading codes are setting elements. As a result, even when many radio communication terminal apparatuses 200 belong to the same cell, it is possible to further reduce the likelihood of collision of transmission packets in RACH.

Example Embodiment 2

Figure 6:
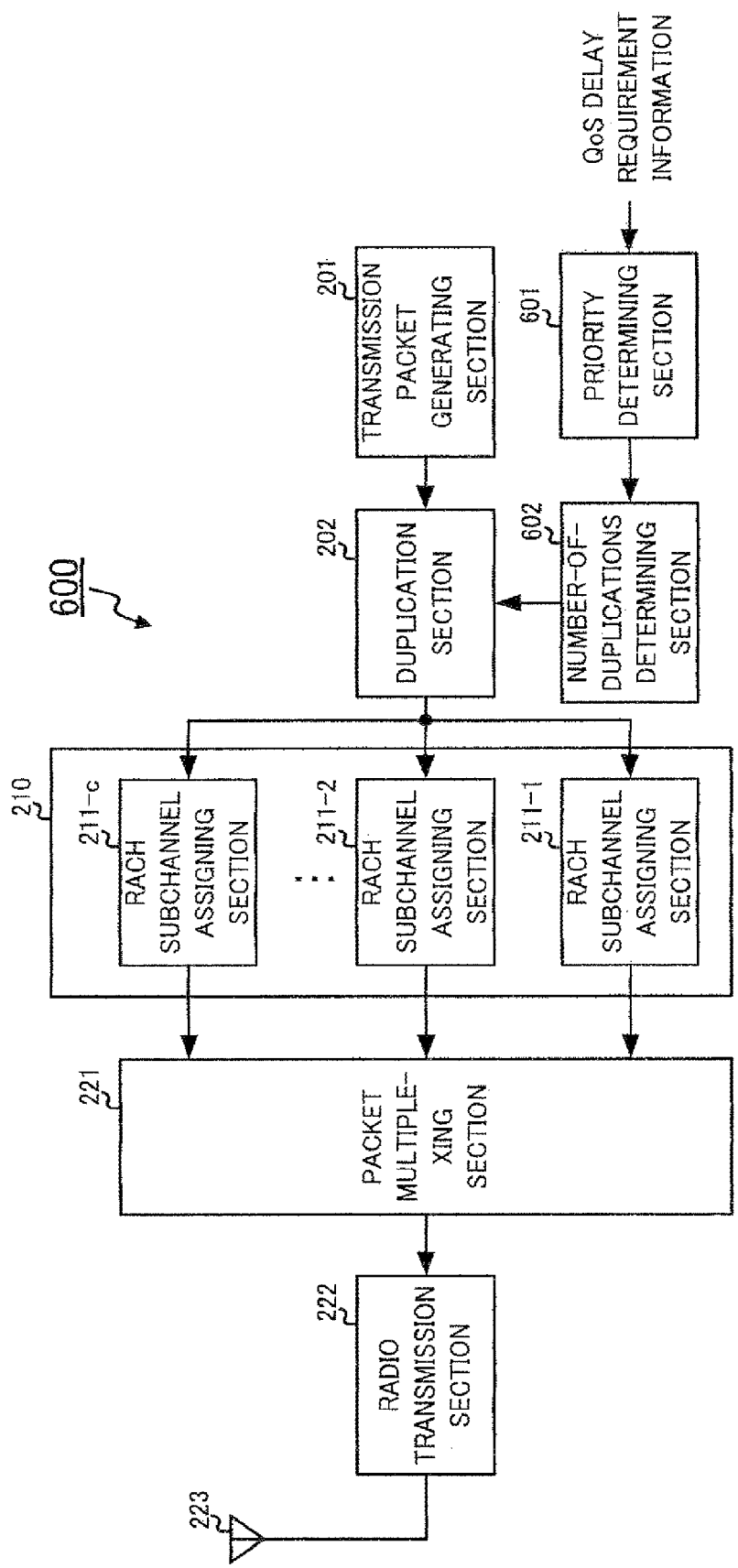
FIG. 6 is a block diagram showing a configuration of a radio communication terminal apparatus according to Embodiment 2 of the present invention.

FIG. 6 is a block diagram showing a configuration of radio communication terminal apparatus 600 according to Embodiment 2 of the present invention. Radio communication terminal apparatus 600 further includes priority determining section 601 and number-of-duplications determining section 602 in radio communication terminal apparatus 200 explained in Embodiment 1. Therefore, radio communication terminal apparatus 600 includes many components to show the same function as in the components of radio communication terminal apparatus 200, so that such components are assigned the same reference numerals as in the components of radio communication terminal apparatus 200, and explanations thereof will be omitted.

Priority determining section 601 determines a priority according to kinds of services planned by radio communication terminal apparatus 600 after communication with base station apparatus 100 is started. For example, in call services and video streaming services, since allowable delay time is short (QoS delay requirement is demanding), priority determining section 601 determines that high priority is necessary in radio communication terminal apparatus 600 scheduled to plan such service. Priority determining section 601 then inputs information of the determined priority to number-of-duplications determining section 602.

Number-of-duplications determining section 602 compares priority information input from priority determining section 601 with a conversion table provided in advance, determines the number of duplications corresponding to the priority and inputs information of, the determined number of duplications to duplication section 202.

Figure 7:
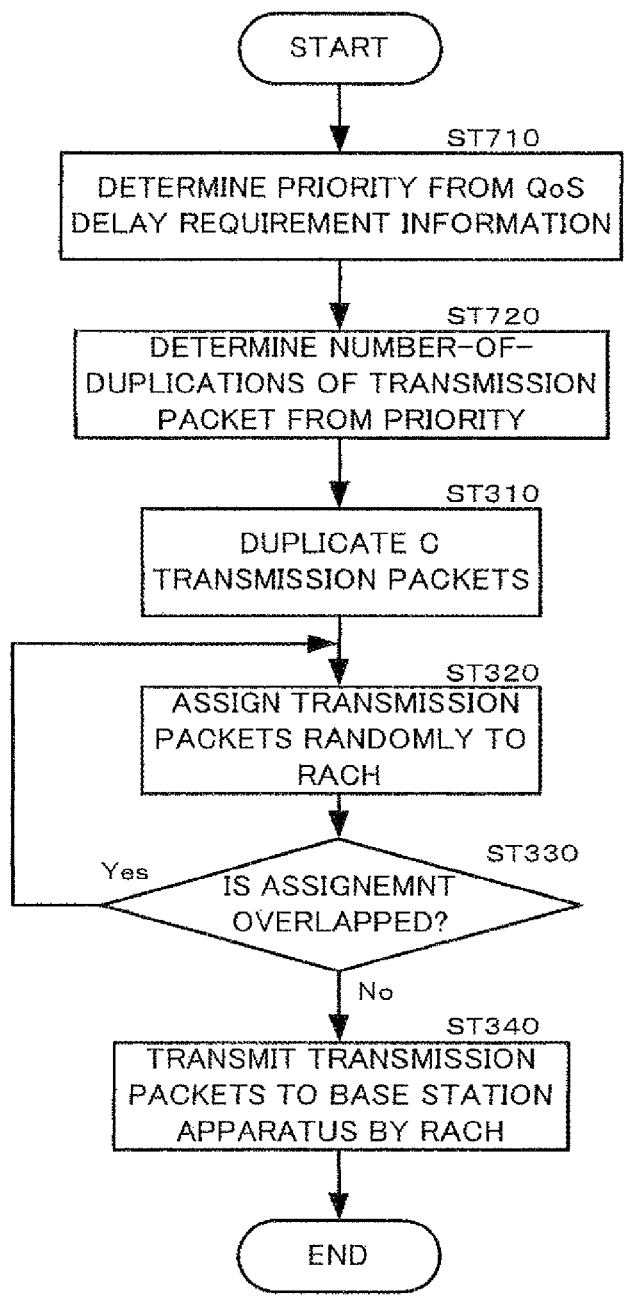
FIG. 7 is a flow chart explaining a random access method according to Embodiment 2 of the present invention.

Next, the operations of radio communication terminal apparatus 600 will be explained using FIG. 7. FIG. 7 is a flow chart explaining steps of the random access method according to Embodiment 2 of the present invention.

First, in step ST710, priority determining section 601 determines a priority of radio communication terminal apparatus 600 based on QoS delay requirement information input from control section or the like (not shown).

Subsequently, in step ST720, number-of-duplications determining section 602 determines the number of duplications of transmission packets according to the priority determined in step ST710, and inputs information of the number of duplications to duplication section 202.

Then, steps ST310 to 340 in Embodiment 1 are to be sequentially executed.

Here, an example of the conversion table held in number-of-duplications determining section 602 will be shown below in "Table 1." This conversion table is made such that $\alpha=1$, based on $c=\alpha x p$ ... (1) {c is the number of duplications, $\alpha$ is constant and p is the priority}.

TABLE 1

| Priority:Number of duplications |
| --- |
| 5:5 |
| 4:4 |
| 3:3 |
| 2:2 |
| 1:1 |

In this way, according to the random access method of this embodiment, the number of duplications of transmission packet in duplication section 202 are determined according to kinds of services to be planned after an individual channel is established, and as QoS delay requirement out of a plurality radio communication terminal apparatuses 600 becomes more demanding so that it is possible to establish the individual channel to base station apparatus 100 in a short time. As a result, according to the random access method according to this embodiment, the problems of deterioration of communication quality, non-accessible state for communication and the like are made less likely to occur in the plurality of the whole radio communication terminal apparatuses 600 belonging to the same cell.

Example Embodiment 3

Figure 8:
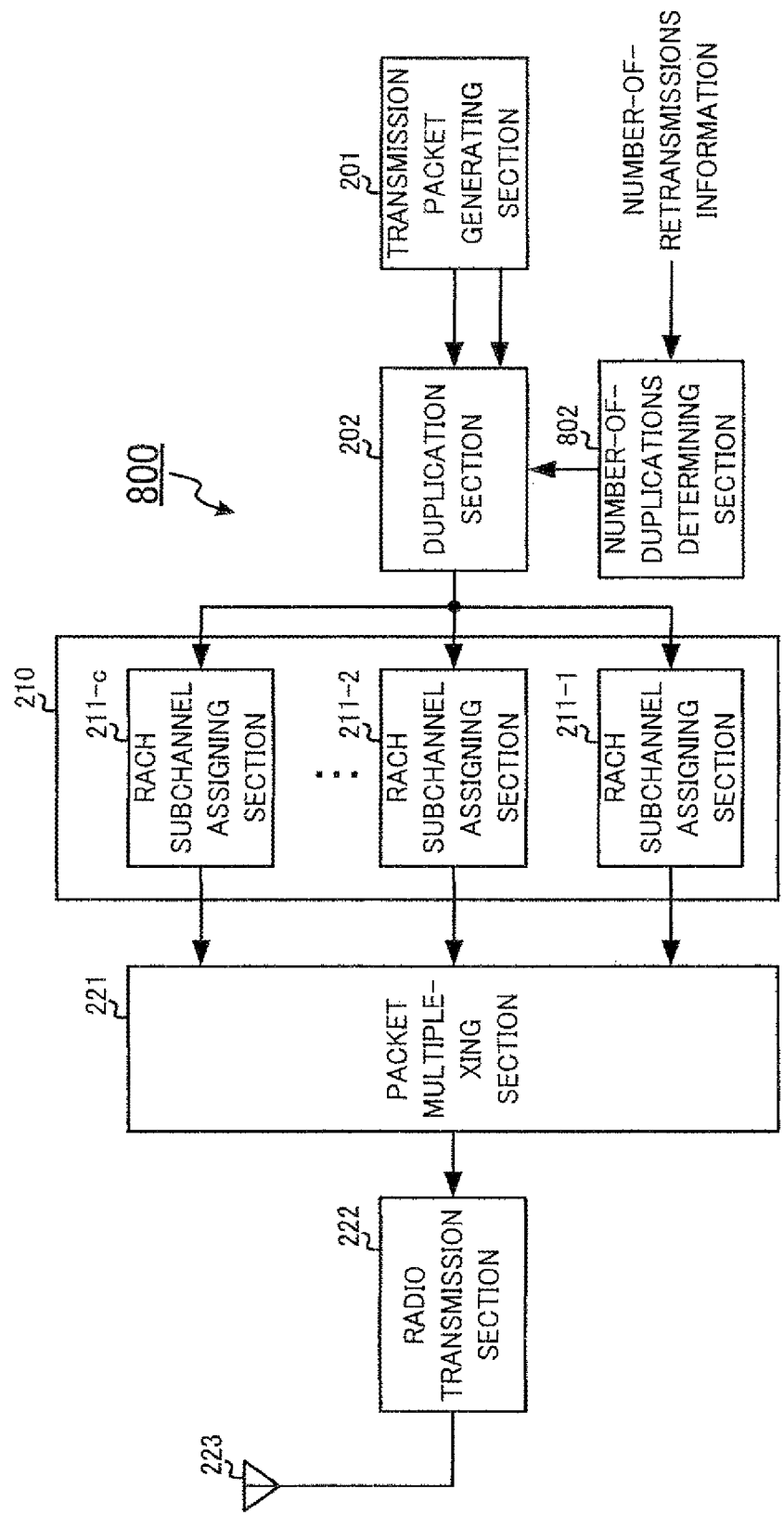
FIG. 8 is a block diagram showing a configuration of a radio communication terminal apparatus according to Embodiment 3 of the present invention.

FIG. 8 is a block diagram showing a configuration of radio communication terminal apparatus 800 according to Embodiment 3 of the present invention. Radio communication terminal apparatus 800 further includes number-of-duplications determining section 802 in radio communication terminal apparatus 200 explained in Embodiment 1. Radio communication terminal apparatus 800 includes many components to show the same function as in the components of radio communication terminal apparatus 200 so that such components are assigned the same reference numerals as in the components of radio communication terminal apparatus 200, and explanations thereof will be omitted.

Number-of-duplications determining section 802 compares information of the number of retransmissions input from control section or the like (not shown) with a conversion table provided in advance, determines the number of duplications corresponding to the number of retransmissions and inputs information of the determined number of duplications to duplication section 202. In addition, "the number of retransmissions" in this embodiment is incremented every time all TS1 to TS5 shown in either of FIGS. 4A to 4D are transmitted.

Figure 9:
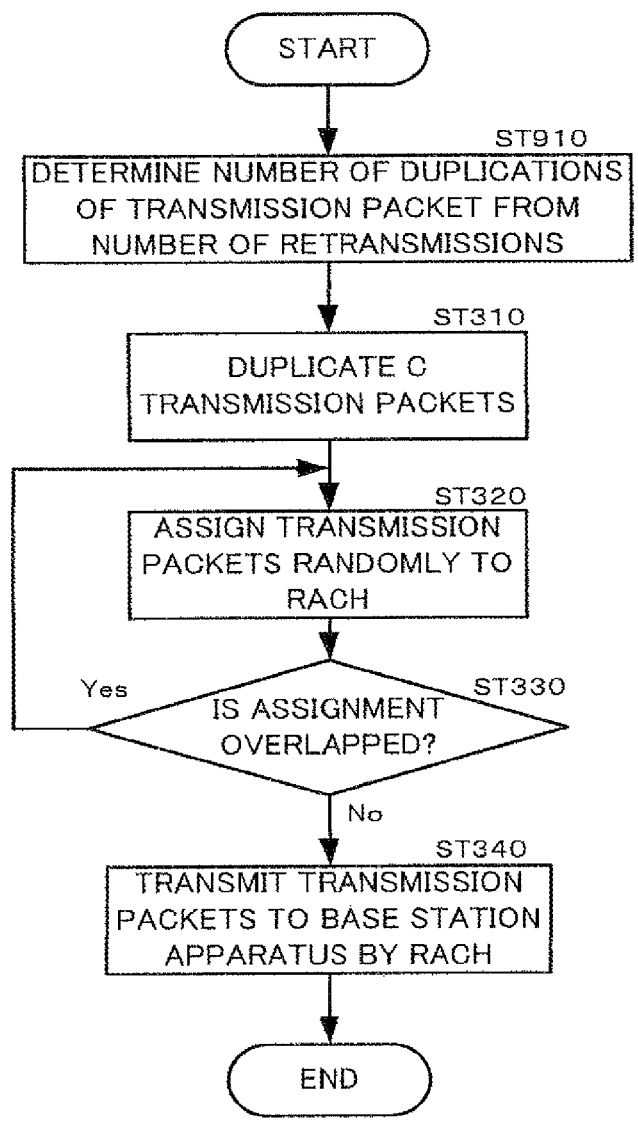
FIG. 9 is a flow chart explaining a random access method according to Embodiment 3 of the present invention.

Next, the operations of radio communication terminal apparatus 800 will be explained using FIG. 9. FIG. 9 is a flow chart explaining steps of a random access method according to this embodiment.

First, in step ST910, number-of-duplications determining section 802 compares the number of retransmissions input with the conversion table provided in advance, determines the number of duplications of the transmission packet and inputs information of the determined number of duplications to duplication section 202.

Then, steps ST310 to ST340 in Embodiment 1 are to be sequentially executed.

Here, an example of a conversion table held in number-of-duplications determining section 802 will be shown below in "Table 2." This conversion table is made such that $\beta=1$, based on $c=Fx\beta$... (1) {c is the number of duplications, F is the number of retransmissions and $\beta$ is constant}.

TABLE 2

| Number of retransmissions:Number of duplications |
| --- |
| 5:6 |
| 4:5 |
| 3:4 |
| 2:3 |
| 1:2 |

In this way, according to the random access method of this embodiment, the number of transmission packets transmitted from radio communication terminal 800 to base station apparatus 100 by RACH increases according to the number of retransmissions so that, out of a plurality of radio communication terminal apparatuses 800 belonging to the same cell, one with higher urgency is more likely to establish the individual channel to base station apparatus 100 in a short time. As a result, according to the random access method of this embodiment, the problems of deterioration of communication quality, non-accessible state for communication and the like are made less likely to occur in the plurality of the whole radio communication terminal apparatuses 800 belonging to the same cell.

Example Embodiment 4

Figure 10:
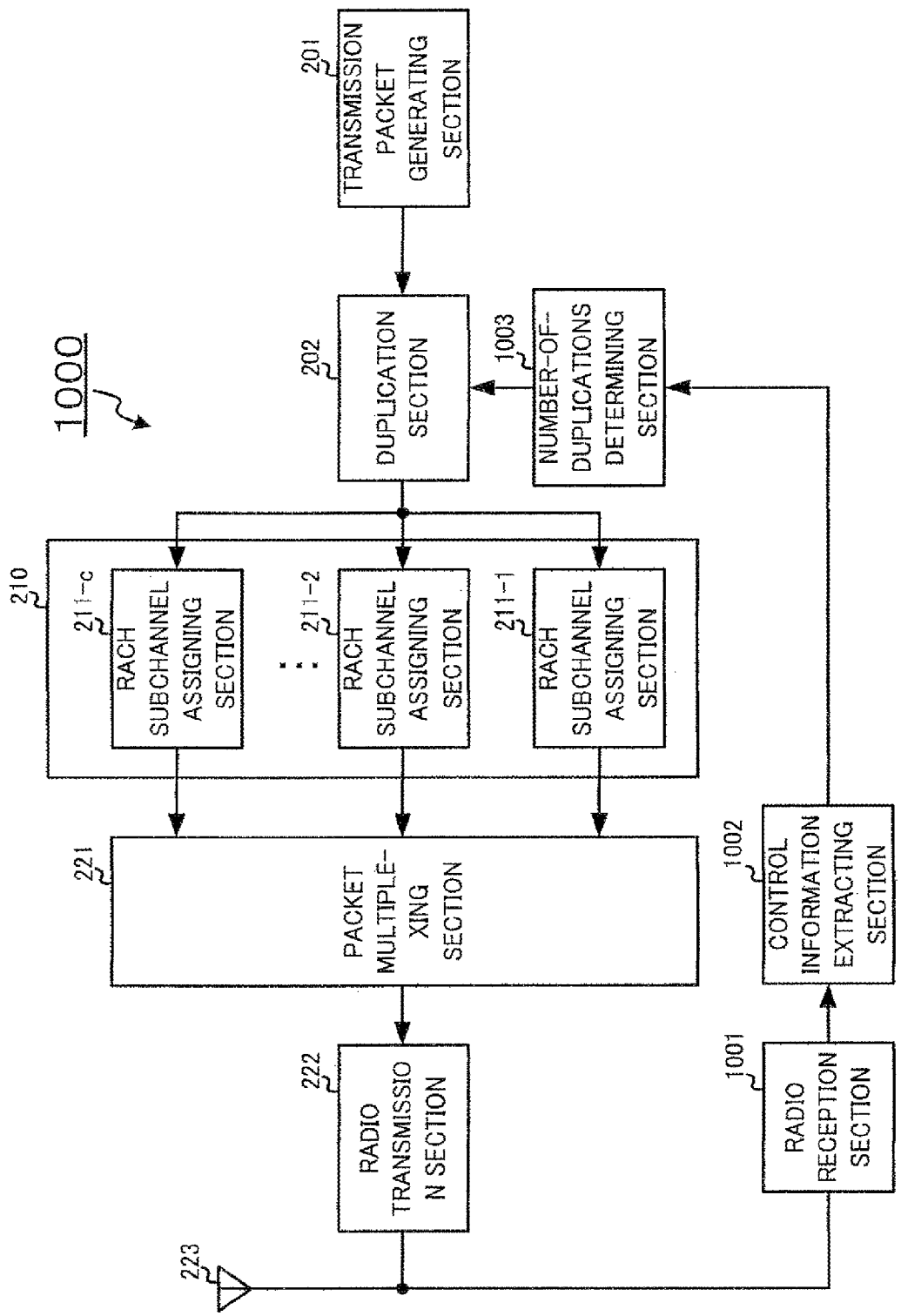
FIG. 10 is a block diagram showing a configuration of a radio communication terminal apparatus according to Embodiment 4 of the present invention.

FIG. 10 is a block diagram showing a configuration of radio communication terminal apparatus 1000 according to Embodiment 4 of the present invention. Radio communication terminal apparatus 1000 further includes radio reception section 1001, control information extracting section 1002 and number-of-duplications determining section 1003 in radio communication terminal apparatus 200 explained in Embodiment 1. Radio communication terminal apparatus 1000 includes many components to show the same function as in the components of radio communication terminal apparatus 200 so that such components are assigned the same reference numerals as in the components of radio communication terminal apparatus 200, and explanations thereof will be omitted.

Radio reception apparatus 1001 includes bandpass filter, A/D converter, low noise amplifier, guard interval removal apparatus, S/P converter, FFT apparatus, P/S converter or the like, and acquires an OFDM signal to notify the number of radio communication terminal apparatus 1000 which belong to cell A transmitted regularly from base station terminal 100 through antenna element 223, and after predetermined reception signal proceeding to the OFDM signal is performed, radio reception section 1001 inputs the OFDM signal to control information extracting section 1002.

Control information extracting section 1002 extracts information of the number of radio communication terminal apparatuses 1000 belonging to cell A out of the reception signal input from radio reception section 1001, and inputs the extracted control information to number-of-duplications determining section 1003.

Number-of-duplications determining section 1003 compares control information input from control information extracting section 1002 with the conversion table provided in advance, determines the number of duplications corresponding to the control information and inputs the information of the determined number of duplications to duplication section 202.

Figure 11:
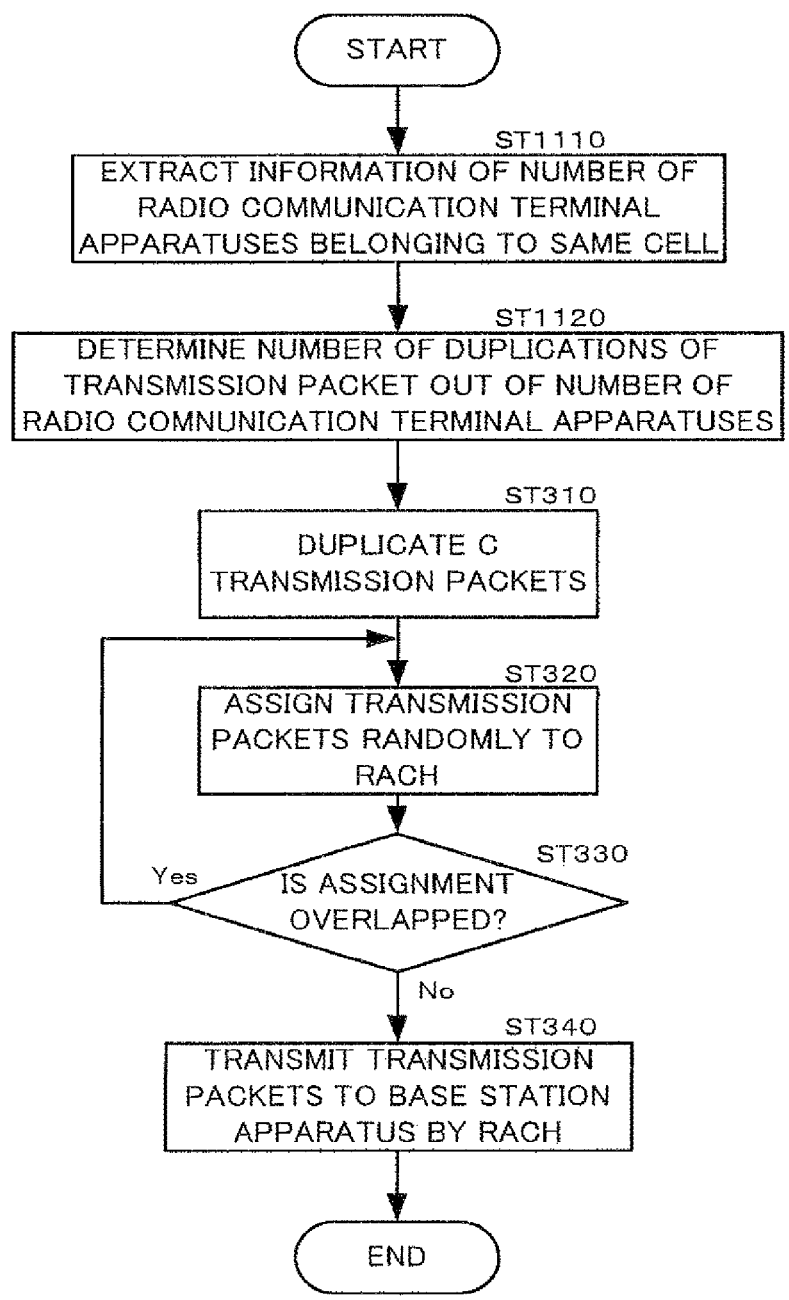
FIG. 11 is a flow chart explaining a random access method according to Embodiment 4 of the present invention.

Next, the operations of radio communication terminal apparatus 1000 will be explained using FIG. 11. FIG. 11 is a flow chart explaining steps for a random access method according to this embodiment.

First, in step ST1110, control information extracting section 1002 extracts control information from reception signal input from radio reception section 1001.

Then, in step ST1120, number-of-duplication determining section 1003 learns the number of radio communication terminal apparatuses 1000 belonging to cell A based on control information and determines the number of duplications corresponding to this number with reference to the conversion table provided in advance.

Steps ST310 to ST340 in Embodiment 1 are to be sequentially executed.

Here, an example of the conversion table held in number-of-duplications determining section 1003 will be shown below in "Table 3." In table 3, RACH subchannel assigning section 211 is taken to process a total of 1000 RACH subchannels composed of 10 time slots and 100 subcarriers per time slot as a RACH unit, assign 100 transmission packets at maximum in one unit and furthermore, radio communication terminal apparatus 1000 belongs to priorities 1 to 5.

TABLE 3

| Priority/Number of duplications |
|---|
| (number of terminals)/(20):(35):(100) |
| 5/7(4):5(7):1(20) |
| 4/6(4):4(7):1(20) |
| 3/5(4):3(7):1(20) |
| 2/4(4):2(7):1(20) |
| 1/1(4):1(7):1(20) |
| Sum of the number of duplications: |
| 92:98:100 |

Figure 12A:
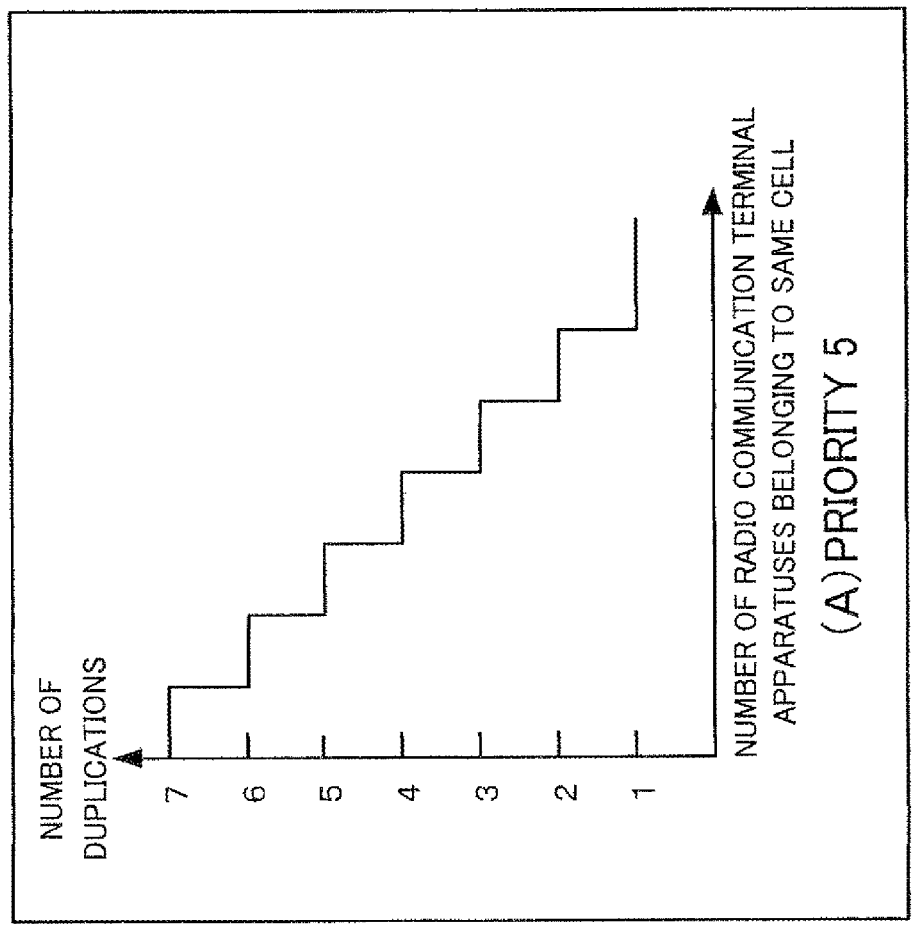
FIG. 12A shows a correlation between a priority, the number of the radio communication terminal apparatuses belonging to the same cell, and the number of duplications of a transmission packet according to Embodiment 4.
Figure 12B:
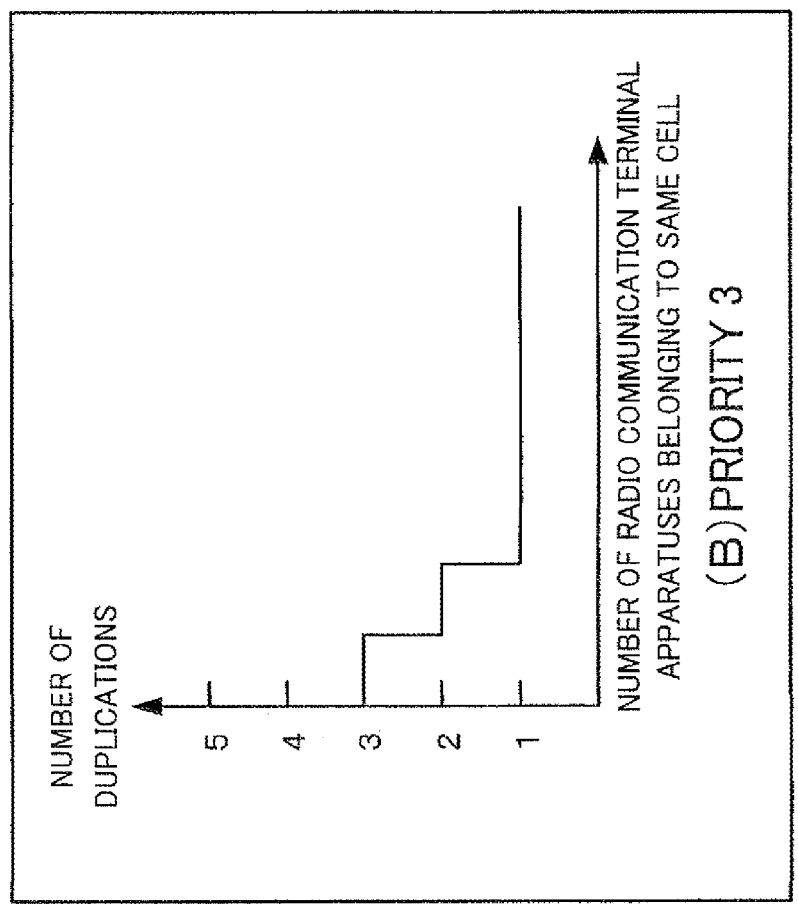
FIG. 12B shows a correlation between a priority, the number of the radio communication terminal apparatuses belonging to the same cell, and the number of duplications of a transmission packet according to Embodiment 4.

Furthermore, in FIG. 12A, correlation between the number of radio communication terminal apparatuses 1000 belonging to cell A and the number of duplications about priority 5 in this embodiment is shown. Also, in FIG. 12B, correlation between the number of radio communication terminal apparatuses 1000 belonging to cell A and the number of duplications about priority 3 in this embodiment is shown. As shown in FIG. 12A and FIG. 12B, this embodiment is set such that the number of duplications of transmission packet in duplication section 202 decreases with increase of the number of radio communication terminal apparatuses 1000 belonging to the same cell.

Therefore, according to the random access method of this embodiment, as the number of radio communication terminal apparatuses 1000 belonging to the same cell increases, the number of transmission packets transmitted by radio communication terminal apparatuses 1000 decreases so that it is possible to reduce the likelihood of collision of transmission packets at RACH in the same cell. As a result, according to the random access method according to this embodiment, the problems of deterioration of communication quality, non-accessible state for communication and the like are made less likely to occur in the plurality of the whole radio communication terminal apparatuses 1000 belonging to the same cell.

In addition, although in the above embodiments, a case has been described where the duplicated transmission packets are multiplexed and transmitted in subcarriers or time slots, when, for example, other resources such as radio communication terminal apparatus 200 include a plurality of transmission antennas, it is possible to multiplex and transmit the duplicated transmission packets in spatial resources such as transmission antenna and directivity pattern, and spreading codes in CDMA system.

In addition, function blocks used in the explanations of the above embodiments are typically implemented as LSI constituted by an integrated circuit. These may be individual chips or partially or totally contained on a single cup.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2004-065625 filed on Mar. 9, 2004, the entire content of which is expressively incorporated by reference herein.

INDUSTRIAL APPLICABILITY

The random access method and radio communication terminal apparatus according to the present invention provides an advantage of establishing an individual channel to the base station in a short time, and is effective for using in the radio communication system and the like with service demanding QoS delay requirement planned.

The invention claimed is:

1. A terminal apparatus comprising:
    a receiver configured to receive information transmitted from a base station apparatus;
    signal generating circuitry configured to generate, based on received information from the base station, a random access signal requesting service from the base station apparatus and including a random access sequence of bits repeated twice successively in a time domain, and
    a transmitter configured to transmit the random access signal, from the terminal apparatus to the base station apparatus over a random access channel, without waiting for a response from the base station apparatus to confirm whether either of the random access sequences of bits has been received at the base station apparatus, wherein the transmitted random access signal includes the random access sequence of bits in one time slot and the repeated random access sequence of bits in a second, different time slot.

2. The terminal apparatus in claim 1, wherein the random access channel includes one or more of a time slot, frequency, or spreading code.

3. The terminal apparatus in claim 1, wherein the random access channel is associated with radio resources, and wherein the transmitter is configured to transmit the random access signal using a radio resource selected at random from radio resource candidates.

4. The terminal apparatus in claim 1, wherein the received information is a predetermined number.

5. The terminal apparatus in claim 1, wherein the random access sequence of bits and the repeated random access sequence of bits are consecutive in the time domain.

6. The terminal apparatus in claim 1, wherein the transmitter is configured to transmit the random access signal on at least two consecutive time slots.

7. A method implemented in a terminal comprising:
receiving information transmitted from a base station apparatus;
generating, based on received information from the base station, a random access signal requesting service from the base station apparatus and including a random access sequence of bits repeated twice successively in a time domain, and
transmitting the random access signal, from the terminal apparatus to the base station apparatus over a random access channel, without waiting for a response from the base station apparatus to confirm whether either of the random access sequences of bits has been received at the base station apparatus,
wherein the transmitted random access signal includes the random access sequence of bits in one time slot and the repeated random access sequence of bits in a second, different time slot.

8. The method in claim 7, wherein the random access channel includes one or more of a time slot, frequency, or spreading code.

9. The method in claim 7, wherein the random access channel is associated with radio resources, and wherein the random access signal is transmitted using a radio resource selected at random from radio resource candidates.

10. The method in claim 7, wherein the received information is a predetermined number.

11. The method in claim 7, wherein the random access sequence of bits and the repeated random access sequence of bits are consecutive in the time domain.

12. The method in claim 7, wherein the random access signal is transmitted on at least two consecutive time slots.

13. A terminal apparatus comprising:
a receiver configured to receive in a terminal information transmitted from a base station; and
signal generating circuitry configured to generate, based on received information from the base station, a random access signal requesting service for the terminal from the base station and including a first random access sequence of bits and a second random access sequence of bits which are successive in a time domain and which are identical sequences of bits, and
a transmitter configured to transmit the random access signal, from the terminal apparatus to the base station over a random access channel, without waiting for a response from the base station to confirm whether the first random access sequence of bits or the second random access sequence of bits has been received at the base station,
wherein the transmitted random access signal includes the first and second random access sequences of bits in different time slots.

14. The terminal apparatus in claim 13, wherein the random access channel includes one or more of a time slot, frequency, or spreading code.

15. The terminal apparatus in claim 13, wherein the random access channel is associated with radio resources, and wherein the transmitter is configured to transmit the random access signal using a radio resource selected at random from radio resource candidates.

16. The terminal apparatus in claim 13, wherein the received information is a predetermined number.

17. The terminal apparatus in claim 13, wherein the first and second random access sequences of bits are consecutive in the time domain.

18. The terminal apparatus in claim 13, further comprising transmitting the random access signal on at least two consecutive time slots.

19. A method comprising:
receiving in a terminal information transmitted from a base station;
generating, based on received information from the base station, a random access signal requesting service for the terminal from the base station and including a first random access sequence of bits and a second random access sequence of bits which are successive in a time domain and which are identical sequences of bits, and
transmitting the random access signal, from the terminal apparatus to the base station over a random access channel, without waiting for a response from the base station to confirm whether the first random access sequence of bits or the second random access sequence of bits has been received at the base station,
wherein the transmitted random access signal includes the first and second random access sequences of bits in different time slots.

20. The method in claim 19, wherein the received information is a predetermined number.

21. The method in claim 19, wherein the first and second random access sequences of bits are consecutive in the time domain.

22. The method in claim 19, further comprising transmitting the random access signal on at least two consecutive time slots.

* * * * *